(12) United States Patent
George

(10) Patent No.: US 9,229,984 B2
(45) Date of Patent: Jan. 5, 2016

(54) PARAMETER EXPRESSIONS FOR MODELING USER DEFINED FUNCTION EXECUTION IN ANALYTICAL DATA PROCESSING SYSTEMS

(75) Inventor: Muthian George, Fremont, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 606 days.

(21) Appl. No.: 13/272,598

(22) Filed: Oct. 13, 2011

(65) Prior Publication Data

US 2012/0191690 A1 Jul. 26, 2012

Related U.S. Application Data

(63) Continuation-in-part of application No. PCT/US2011/022437, filed on Jan. 25, 2011.

(51) Int. Cl.
*G06F 17/30* (2006.01)

(52) U.S. Cl.
CPC ................. *G06F 17/30471* (2013.01)

(58) Field of Classification Search
CPC .............. G06F 17/30864; G06F 17/30; G06F 17/30389; G06F 17/30424; G06F 17/30448; G06F 17/30867; G06F 17/30967; G06F 21/6227
USPC ......................................................... 707/759
See application file for complete search history.

(56) References Cited

U.S. PATENT DOCUMENTS

| | | | |
|---|---|---|---|
| 6,067,542 A | 5/2000 | Carino, Jr. | |
| 6,385,604 B1 | 5/2002 | Bakalash et al. | |
| 6,473,750 B1 | 10/2002 | Petculescu et al. | |
| 2003/0037048 A1 | 2/2003 | Kabra et al. | |
| 2006/0010159 A1 | 1/2006 | Mirchandani et al. | |
| 2006/0136415 A1 | 6/2006 | Ramsey et al. | |
| 2010/0036801 A1* | 2/2010 | Pirvali et al. | 707/2 |
| 2010/0250572 A1 | 9/2010 | Chen et al. | |
| 2011/0082868 A1* | 4/2011 | Musuluri | 707/749 |

FOREIGN PATENT DOCUMENTS

| | | | |
|---|---|---|---|
| EP | 0459683 A3 | 4/1993 | |
| EP | 0455447 A3 | 6/1993 | |

* cited by examiner

*Primary Examiner* — Truong Vo
(74) *Attorney, Agent, or Firm* — Tarolli, Sundheim, Covell & Tummino L.L.P.

(57) ABSTRACT

Systems and apparatuses are provided for analytical data processing. A system includes a processor and a non-transitory computer readable medium, comprising machine readable instructions executable by the processor. The instructions include a query compiler to identify a call to a user defined function within a query. The call to a user defined function includes an input argument and a parameter expression defining a parameter value for the user defined function. A processing engine executes the user defined function to provide a function output according to the input argument and the defined parameter value.

15 Claims, 2 Drawing Sheets

PARAMETER EXPRESSIONS FOR MODELING USER DEFINED FUNCTION EXECUTION IN ANALYTICAL DATA PROCESSING SYSTEMS

RELATED APPLICATIONS

The present invention claims priority from and is a Continuation-in-Part of PCT/US11/22437 filed on 25 Jan. 2011, which is herein incorporated by reference.

TECHNICAL FIELD

This invention relates to information processing, and more particularly, to the application of parameter expressions for modeling user defined function execution in data processing systems.

BACKGROUND

Analytical processing systems consume tables of data which are typically linked together by relationships that simplify the storage of data and make queries of the data more efficient. A standardized query language, such as Structured Query Language (SQL), can be used for creating and operating relational databases. Analytics involving statistical and other numerical procedures is the application of computer technology to solve problems in business and industry. The science of analytics is concerned with extracting useful properties of data using computable functions and, generally speaking, involves the extraction of desired properties of data sets from large databases. Analytics therefore bridges the disciplines of computer science, statistics, and mathematics.

DETAILED DESCRIPTION

Many databases have the framework for processing a limited number of relatively straightforward in-built analytic functions. Unfortunately, real-world analytical problems in databases go beyond the analytic functions natively supported, and datasets in databases that require intensive analytical processing often end up using third party analytical packages for analytical processing. In situations where the datasets are large, they are often retained outside the databases due to the limited analytical capabilities available in databases. These packages require data to be retrieved from databases, persisted outside the database, and reformatted before processing. Since these approaches move data away from the secure database tables to a location associated with the analytical processes, the result is a replication of same large raw data sets in different formats in multiple locations, with the accompanying security and data governance risk for confidential data. Further, this approach results in excessive manpower cost, licensing costs for analytics processing, and hardware cost for data retrieval, management, and storage. The complexity in processing results in significant latency, making it impractical for real-time analytics.

User defined functions are of varied in nature and can include general statistical and numerical computations that are commonly used across different applications as well as specialty analytics that apply to vertical markets. In order to integrate user defined functions into the database engine, the systems and methods described below standardize the syntax and usage of user defined function in a query. This standardized syntax allows for the invocation of user defined functions that represent more than a single instance of an application program model. The user defined functions are adaptable via a parameter expression to represent the program model in a more general fashion. This ability of the function to provide multiple, different instantiations of a general application program model, referred to herein as function polymorphism, allows for a reduction in the overall number of function implementations necessary to implement the desired functionalities in a single user defined function. Further, integrating such user defined functions into a database engine for execution through a SQL query significantly reduces the analytical application processing time, thus, allowing the results to reflect the truth of the data universe at the time of performing the analytics.

Figure 1:
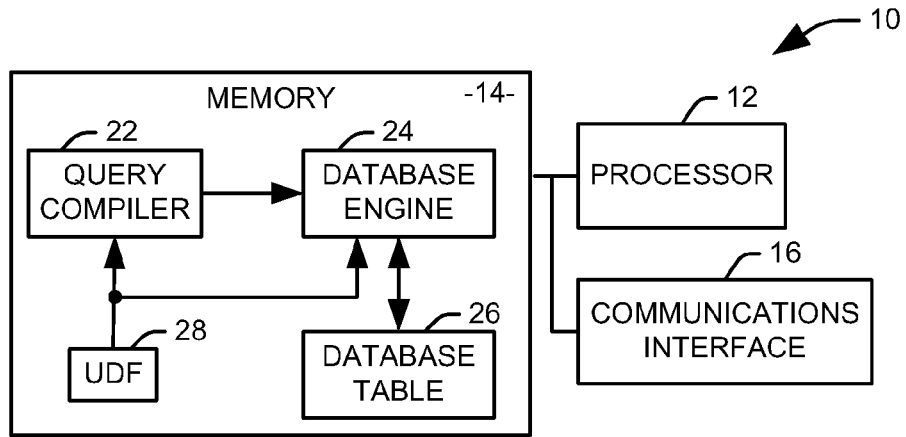
FIG. 1 illustrates an example of an analytical data processing system in which user defined functions (UDFs) use parameter expressions to represent general application program models.

FIG. 1 illustrates an example of an analytical processing system 10 in which user defined functions (UDFs) use parameter expressions to represent general application program models. For example, the system 10 of FIG. 1 can represent a database system, a data warehouse, a data mart, an in-memory database, a standalone OLAP engine, a business intelligence report generation system, a data mining system, or a federated query processing system. The system 10 includes a processor 12 and a memory 14 connected to a communications interface 16. It will be appreciated that the communication interface 16 can include any appropriate hardware and machine readable instructions for receiving database queries from an associated query source (not shown) and returning the results of the queries to the query client. Accordingly, the communications interface 16 can include any or all of a bus or similar data connection within a computer system or a wired or wireless network adapter. The memory 14 can include any appropriate standard storage devices suitable for use with computer systems, such as magnetic and optical storage media.

The device memory 14 can include a query compiler 22, a processing engine 24 to compile and execute queries on data tables 26, and a user defined function (UDF) 28. The query complier 22 can utilize any appropriate query language, for example, structured query language (SQL) or multidimensional expression (MDX) language. In one implementation, the user defined function 28 is stored as one of a shared object or a dynamic link library and loaded into an analytical data processing system such as a database. The query compiler 22 identifies a call to the user defined function 28 with a list of input, output and parameter expressions associated with the function call. The query compiler 22 retrieves the input, output and parameter metadata from the user defined function 28 and validates and resolves the lists of input, output and parameter expressions in the call to the user defined function in the query. It will be appreciated that not every function will have an input, for example, table-valued user defined functions generally do not have input field arguments. Similarly, not every user defined function has parameter expressions. When output fields are not specified in a call to the user defined function, default output fields defined in the metadata of the user defined function can be used for mapping the output table object. It will further be appreciated that the list of output expressions in a call to the user defined function can represent a subset (i.e., less than all) of the output fields associated with the user defined function. The output fields can be mapped in any order irrespective of the order in which they are mapped in the output metadata of the user defined function. The database engine 24 starts the execution process to the user defined function by composing input and output table and parameter objects from the arguments in the user defined function call in the query and proceeds to execute the function using input rows set in the input table object. When result rows are produced from the user defined function in the output table object, they are retrieved by the database engine 24.

To facilitate the generation of the input and output table objects, the user defined function 28 exposes input, output and parameter metadata fields to the query compiler 22 and the processing engine 24. In the illustrated implementation, the metadata fields of input, output and parameters of the user defined function can include a field name, a description of the field and an associated data type for each field. Output fields additionally have an indicator to indicate if the field is used as a default field. When a call to the user defined function does not explicitly map output field expressions, the default output fields are used for composing the output table object. The metadata can further include a defined class type, parameter fields for customizing the function to a particular application and other processing instructions for the user defined function 28. In one instance, the exposed metadata can further include an application programming interface (API) comprising rules for validating and resolving arguments within the call to the user defined function. It will be appreciated, however, that for the majority of user defined functions, a generalized API function pointer in the metadata will validate and resolve arguments unless the user defined function requires a specific function for special handling for resolving input, output and parameter arguments. The user defined function metadata also includes a second function pointer to construct a processing object instance for the user defined function.

User defined functions representing application program models can specify one or more parameters in parameter expressions for generating concrete instances of application program models. Depending on the user defined function, parameter metadata fields can be set as optional or mandatory, and optional parameter metadata fields can, but do not need to, provide default parameter values. The application program models utilizing these parameter expressions can be conceptualized in three general categories. One category of application program model uses integer parameter expressions to define variable input and output fields to represent multiple variant fields in a call to the user defined function to generate a given analytical model. Variable field defines a class of fields for the generation of zero, one, or multiple concrete field instances at runtime of the user defined function. A variable input or output metadata field is often set to depend upon a parameter metadata field of integer data type. An output metadata field may be set to depend upon an input metadata field which is resolved either by a parameter metadata field or by computation from the total number of input argument fields and fixed input metadata fields if there is only one input variable field. A variable field application program model is ideal for fitting statistical application models such as least-squares, maximum likelihood, multiple regression and multivariate analytics with varying input fields to match the variable fields and parameters to define the statistical models. This usage of integrated parameterization allows for efficient implementation of statistical model fitting analytics such as least-squares, multiple regression, maximum likelihood and multivariate analytics where each model variant is expressed in terms of one or more variable fields. A second category of application program model uses parameter values to provide values needed for internal application configuration and processing. A third category of application model is represented by parameter values for providing connectivity to external application processes and appropriate query or program script for a given external application process. In general, the systems and methods described here utilize parameters to determine the interrelationship between input, output and processing scenarios of user defined functions that support application program models.

User defined functions (e.g., 28) that represent application program models define parameters associated with the models in the form of parameter metadata fields. A parameter field is defined with a field name or key, a description, a parameter field data type, an indicator to show if it is an optional parameter field and a default parameter value for the optional field, if it has one. A user defined function 28 representing an application program model might utilize one or more parameters, and they are defined in an array of parameter fields as a part of the user defined function metadata. User defined function expressions in queries are validated and resolved by the query compiler 22. For user defined functions that represent application program models, processing instances are generated at the processing engine 24. User defined functions with variable input and output fields are validated with the help of their supporting parameter field value. For variable fields, the number of concrete field instances are generated using the integer parameter value and discrepancies between user defined function expression and requirement are thrown as exceptions.

Figure 2:
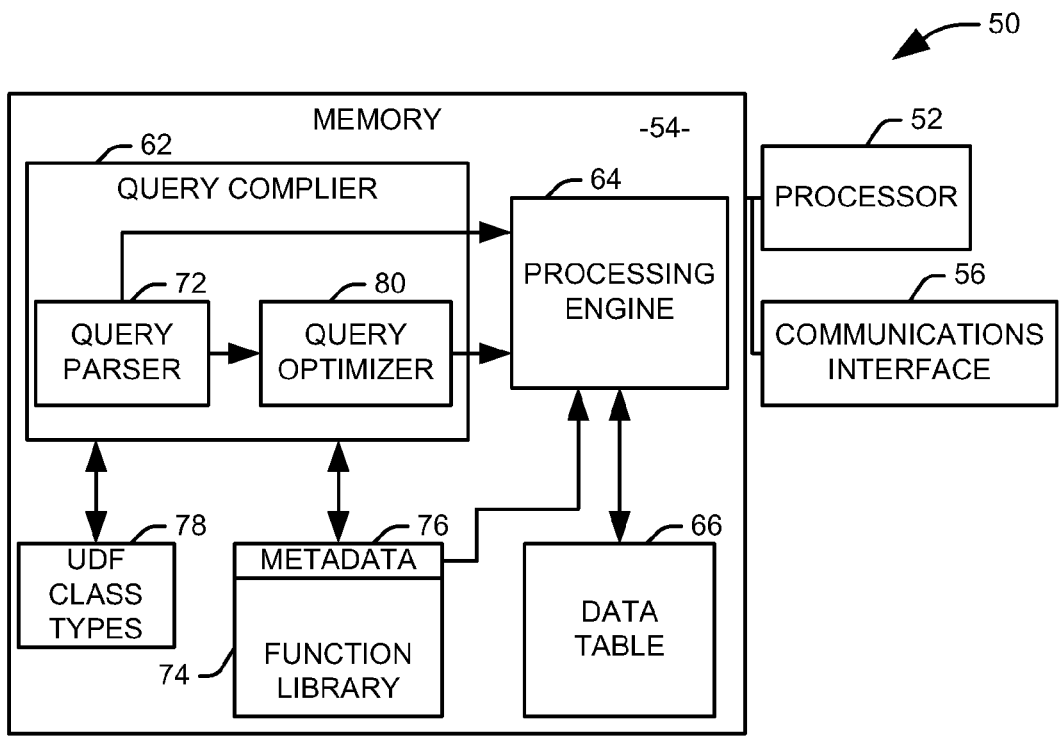
FIG. 2 illustrates one example of the integration of an analytical processing system into a database system, such that specific instances of a general application program model, represented by a user defined function, can be invoked through parameter expressions within a call to the function.

FIG. 2 illustrates one example of the integration of an analytical processing system into a database system 50, such that specific instances of a general application program model, represented by a user defined function (UDF), can be invoked through parameter expressions within a call to the function. The system 50 includes a processor 52 and a memory 54 connected to a communications interface 56. It will be appreciated that the communication interface 56 can comprise any appropriate hardware and machine readable instructions for receiving database queries from an associated query source (not shown) and returning the results of the queries to the query source. Accordingly, the communications interface 56 can include any or all of a bus or similar data connection within a computer system or a wired or wireless network adapter. The memory 54 can include any appropriate standard storage devices associated with computer systems, such as magnetic and optical storage media.

The device memory 54 can include a query complier 62 and a database engine 64 to compile and execute queries on a database table 66. The query complier 62 includes a query parser 72 that identifies a call to a user defined function and any input, output, and parameters expressions that may be available in the call to the user defined function. To this end, the query parser 72 processes a call to a user defined function in a database query using a standardized user defined function syntax to distinctly map the input, output, and parameter expressions to appropriate objects. For expressions in UDF inputs, the processing engine 64 evaluates the expressions and passes the evaluated values for the respective UDF input fields. For expressions in UDF output fields, the compiler 62 separates the expressions from the UDF output fields. The compiler 62 sets up a unique list of output fields for the UDF to process so that all the UDF output expressions can be computed in a call to the user defined function. The processing engine 64 retrieves the values from the UDF output fields and evaluates the output expressions for each output row.

In one implementation, the user defined functions are built in a UDF library 74, for example, as shared objects or dynamic link libraries, and registered with the database engine. As described previously, each user defined function exposes a self-describing UDF metadata 76 that can be retrieved by the query complier 62 for query resolution and validation. The metadata object of a UDF is a self contained and describing object. It contains the function pointers for the UDF processing factory constructor, and the validation and resolution utility function. It has the arrays of input, output and parameter fields. The UDF metadata object can include the UDF name, UDF description, class type, and an indicator to denote if the UDF requires all the input records together while processing.

The UDF metadata 76 can include output field metadata providing for each field a name, a description, a data type, an indicator to denote if the field is a variable field, a variable field resolving parameter field name, a size of the field, a null indicator, a resolving input metadata field name for output fields, and an indicator to denote if an output field is returned as a default field when the query does not map output fields. If the variable field indicator for a given field is set, the field is a variable field. If it is not set, it is a fixed output field, and will represent only a single field occurrence in the output returned for the query. The data type of the field can be set to one of a valid data types or set to an undefined type. If the data type of the output field is set as undefined, the output field can inherit the data type associated with its resolving input field name and the corresponding input argument. When the data type of the resolving input field metadata is undefined, the input metadata field gets first defined at the time of query compilation with the input argument field from the query table field which, in turn, resolves the dependent output field. In such a case, the size of the field and the null indicator are also inherited from the input argument in the query. Through the default output indicator field, the metadata for each UDF designates a list of fields as default output fields. For example, these default fields can be determined by a developer based on the general usage of the analytic function represented by the UDF. When UDFs in queries do not explicitly map output fields, the default fields are returned from the UDF in the order of their occurrence in the UDF output metadata. There must be at least one default output field for a user defined function. When queries map UDF output fields explicitly in a call to the user defined function, the default output fields are ignored. There is no restriction in using default output fields in the explicit output field mapping list.

Function input fields are extracted from query fields, and composed as an input table object. Similarly, output fields for the function call can be resolved and validated from the list of output field metadata for the function. The query compiler 62 structures these input and output fields into self-describing table objects with field names, data types and data size to standardize processing of all user defined function class types capable of handling multiple records simultaneously. Each table object has its own metadata to describe each field of the rows in the table object in terms of its field name, data type, data length, and indicator showing if the field has null values. Tables also have the ability to store and retrieve rows of data based on row number. They are capable of handling large row sets with the ability to manage memory overflow into disk files.

Each output field has a unique name within a UDF, specified in the UDF output field metadata. There is one UDF output field metadata object for each output field, such that for N output fields for a UDF, there are N output field metadata objects in an array. Similarly, there are arrays of input and parameter field metadata objects. Input, output and parameter metadata arrays are packaged together in a UDF metadata object along with additional information. The UDF metadata object is specified by the UDF developer as an immutable static object that is compiled along with the UDF processing code. The UDF processing code consists of an implementation of a UDF interface class, a factory constructor function to create an instance of the UDF processing object and, optionally, a utility function for validating and resolving the UDF specification in a query at query compile time. In most of the cases, a general purpose utility function is sufficient for the validation and resolution of UDF specification in a query. UDF specific validation and resolution utility functions are built only for special validation and resolution requirements. For example, a given utility function can validate the data type of any parameter expression according to data type provided by the parameter field metadata such that the utility function evaluates the integer parameter expression to determine the repetition count for any variable input or output fields.

The listing of fields in the output expression allows the output of a user defined function to be mapped to a list of fields provided within the output metadata. When the number of output fields in the query is less than the number of output fields from a call to the user defined function, the user defined function returns only the fields that are mapped in the query. Output fields can be mapped in any order in queries, using either the field name or field position identifier. If output variable fields are mapped using position identifiers, the validation and resolution function substitutes position identifiers with output field names and sets data type and size in the output table object at query compile time.

The metadata 76 for each user defined function can also include an associated class type for each function out of a plurality of function class types 78 to assist in the optimization of the query. The user defined function class types 78 implicitly set the rules for data processing in the database engine along with the cardinality of their output results. For example, user defined functions belonging to some class types will be processed in OLAP windows, whereas such processing is inappropriate for other class types of functions. Unlike inbuilt functions that return only one output field, all the user defined function class types may return one or multiple output fields.

A query optimizer 80 establishes a plan for executing the received query, including any user defined functions in the query. The query optimizer 80 retrieves metadata describing the associated class types of the user defined functions, and uses the associated class type of each user defined function to determine if the number of rows in the output of the function is known or determinate and if the output to the function is unknown or indeterminate. For class types having known outputs, the query optimizer 80 can proceed normally. Functions having indeterminate outputs are handled as part of an alternative optimization process, in which the potential impact of a function having a large number of output rows is mitigated. Each of the data objects extracted by the query parser 72 and the query plan developed at the query optimizer 80 are provided to the database engine 64 to execute the query, including the user defined function.

The database engine 64 uses the extracted query plan objects including the user defined function objects to execute the query plan to provide a query result, and returns the query result to the query source via the communications interface 56. During runtime, data are loaded into the input table object according to the requirements of the user defined function class type. With the input and output table objects as arguments, the data processing API of the user defined function is called to process data. The user defined function emits output into the output table object which is retrieved each time the processing function is called. In case there is no input, as in the case of table-valued user defined functions, the processing function is called with an empty input table object.

In the illustrated implementation 50, each UDF represents an application program model in conjunction with parameter metadata, a generic application model capable of generating a variety of invariant or concrete analytical functions at runtime. The properties of the runtime instance of an analytical function generated at each call to the functions are controlled via input parameter values. Parameters are arbitrary in nature and are dependent upon each UDF application program model. To allow for the recognition of parameter expressions within the system, each parameter associated with a given UDFs is captured within parameter field metadata at the time of UDF development. Each UDF can have zero, one, or multiple parameter fields expressed as an array of parameter metadata fields in the UDF metadata. A UDF parameter metadata field contains the parameter field name or key, its description, data type, an indicator to show if field is an optional parameter and, a default parameter value for optional parameter fields, if any.

Parameter data types are Boolean, integer, double, string, date, time, timestamp, and their array types. Array parameter values are expressed as comma separated values. Each parameter expression consists of a key and a value pair connected by an equal sign, '=', where key is the name of the parameter field metadata and the value is a constant or an expression that evaluates to a constant value at the time of invoking the user defined function. Multiple parameter expressions for a user defined function are separated by a colon, ':', character. A UDF requires all the parameter fields except the ones that are optional. If optional parameter fields have default values, they are automatically collected and supplied to the UDF when the optional fields are not specified in the UDF parameter expression in the query. Default values are given for those parameters in UDFs that often use the default parameter value for computations. For example, in the stock market, a 50 bar moving average is the most commonly used window frame size. When 50 is given as the default frame window size value, the use of such UDF without the parameter expression automatically gets the default value for moving average computations. When the application requires a different window frame size for the computation, the parameter value is explicitly presented in the UDF expression in the query to override the default value.

It will be appreciated that the basic syntax for all user defined functions, regardless of their associated class type, can be standardized, such that they are parsed in a similar manner at the query parser 72. In this syntax, input arguments consist of fields or expressions composed from fields from the SQL query table that can be composed into an input table object, output arguments consist of output fields or expressions composed from output metadata fields from the user defined function that can be composed into an output table object, and parameter arguments are provided in the form of key/value pairs, where the key is the metadata parameter field name of the user defined function and the values for the field represented by the key can be composed into a parameter object. Parameter key/value pairs are separated from one another by a colon character. In SQL queries, the input arguments for UDFs come from query table fields and GROUP BY or OLAP PARTITION BY expressions produce subsets of rows into a table object with one or more input fields. Therefore, field arguments from the query table are separated from parameters to simplify UDF syntax in queries, which helps in processing different class types of UDFs. One example of the standardized syntax for expressing a user defined function in a query can include an expression such as:

<UDF name> ([<Input Expression List>]) [OUTPUT(<Output Expression List>)] [[WITH] PARAMETER (<key=valueExpression>[: . . . ])]

In the above user defined function expression, items within brackets are optional, items within parentheses are mandatory, and items given within chevrons (<>) are replaced with appropriate expressions. The names of the user defined functions are unique and case-insensitive. The user defined functions support variable input and output fields composed as table objects. The various expression lists can comprise a series of comma separated items. The input expression list, if present, can include columns or expressions composed using columns from query table. A mapping for the output fields of the user defined function is provided using the keyword OUTPUT, with the output expression list comprising of one or more output fields or expressions composed from output fields. Output fields are field names from the user defined function output metadata or field position identifiers using "$#" syntax, where $ represents a special character and # represents an ordinal number of the output field left to right starting from one. When the output is not explicitly mapped in a query, default output fields defined within the user defined function can be returned. When output fields are represented by '*' as in OUTPUT(*), all the output fields from the user defined function are returned. Parameters are given as "key=valueExpression" separated by colons, using WITH PARAMETER syntax when a user defined function requires parameters. The "key" is the field name in the user defined function parameter metadata. The "valueExpression" is a constant or an expression that evaluates to a constant. The parameters defined in the expression can be dates, time, timestamps, integers, decimal values (double values), character strings, or comma separated array constants formed from one of these data types.

The query compiler 62 parses the UDF expression and renames the output result of the expression with the user defined alias name when expressions are renamed. This is particularly important when the UDF output fields or ordinal numbers or expressions composed using them need to be renamed into application specific meaningful names. When UDF output fields are defined in terms of ordinal numbers, renaming them with unique alias names across the query makes them usable in other places in the query.

There are a number of UDFs that require variable input and output fields to support variable application program models. Statistical applications that fit analytic application models such as least-squares, multivariate analysis, multiple regression and maximum likelihood fall under this category. For example, the number of independent measure traits required for processing multiple regression models vary for each application instance for which parameter specifying the number of independent number of measure traits is required. There are application program models that require more than one variable field such as least-squares. Least-squares analyses often require a number of independent discrete factors, such as sex type, age-group, year, and quarter in a model, for which one parameter to specify the number of independent factors is required. Many least-squares models also require independent continuous or measure traits, such as advertisement cost and capital investment dollar amount to fit the least-squares model on dependent field sales value, for which another parameter for expressing the number of independent measure traits is required. Additional parameters may also be required for expressing the interaction between different independent factors. Thus, each variable field represents a group of fields at the time of a call to the user defined function. Each variable field will require a different parameter metadata field for generating the variants while calling the user defined function. It is possible that some variable fields share the same integer parameter field when they need the same number of variant fields to be generated in a call to the user defined function.

To allow for flexibility in such applications, input and output fields can be marked as fixed or variable types in the input and output metadata of each user defined function. It will be appreciated that a given user defined function requires a standard order and number of inputs, as defined in the input metadata for the function. Each field is referenced by a corresponding input argument field or fields in the query. Specifically, fixed fields will have only one corresponding input argument field and variable fields can have zero, one or multiple consecutive input argument fields in the query Input and output fields can have fixed or undefined data types within the metadata. When the data type of an input field is undefined, the field obtains its data type from the data type of the corresponding input field argument in the query. The query input field defines if the field has null value or not. Therefore, UDF implementations have to consider the possibility of null values and perform appropriate processing. For fields having a fixed data type, data from the input query field is converted to the required input field type of the user defined function at runtime when the data types do not match and the data type promotion is valid. When the data type is undefined in an output field, it is set to depend upon a specific input field for resolution. At the query complier 62, undefined output fields are resolved from the input fields. Specifically, if an output field is a variable field, a resolving parameter field name can be set. If this variable output field is not set to depend upon a parameter field, an associated resolving input field name from the input field metadata can be used to provide the resolution. If no parameter field or input field is given for resolving a variable output field, then it is an exception.

When parameters are given to fit an application program model, the parameter value is used for generating the number of concrete fields from the variable field in a call to the user defined function. The input fields in the query expression must match the order requirements of the fields including the variable fields. Concrete generated fields from the variable fields occur in consecutive order starting from the occurrence location of the variable field in the metadata. The UDF framework uses this sequence order for input field resolution and validation. In the case of output variable fields, the fields obtain their generated field names in consecutive order at the time of validation and resolution of the UDF expression in the query. The validation and resolution function of the UDF framework generates a full complement of all the output fields internally, according to the designated parameter, and each of such generated output field gets an ordinal number starting from one. Therefore, in a call to the user defined function, each output field gets a unique and fixed ordinal number that can be identified by the $# syntax. However, the query application is at liberty to use either the generated field name or the ordinal number of the output field using the $# syntax for selecting and mapping the output fields to match the output requirements of the query application.

In the case of output variable fields, they could be set to depend upon an input variable field or a parameter field. When they are set to depend upon an input variable field, the input variable field is generally set to depend upon a parameter field. It will be appreciated that when there is only one variable input field for the UDF, the number of fields can be computationally determined from a total number of input arguments and the number of fixed fields. When concrete data type is given for the variable output field, the generated output field obtains the concrete data type from the metadata. However, when the data type is set as undefined, the output fields inherit the data type from the input variable field. When the output field is set to depend upon a parameter field, the parameter field value is used for expanding the output fields. Output variable metadata fields depending only upon parameter fields must always have a concrete data type. Output field metadata having undefined data type must always depend upon an input field metadata for its data type resolution at runtime.

The number of concrete generated fields represented by each variable field, whether determined computationally or via an associated parameter, is referred to as a repetition count. Each variable field can have any repetition count as the upper limit. When a variable field is marked to start with a minimum number of zero count, a parameter field can supply a repetition count of zero just to let the user defined function to ignore the field completely. However, when a variable field is set with a minimum repetition count of one, there must be at least one input argument field for the field at the time of processing the query. If there is only one variable field and it is marked to have a minimum repetition count of zero or one in the metadata, it can be deduced and validated without a parameter specification at the time of compilation. It will be appreciated that variable fields can occur at any input or output position, and there can be multiple variable fields in input and output metadata. The repetition count of a variable field for a given instance of the function can be provided, for example, as an integer parameter expression. The parameter expression can also be used to define scalar or array values of integer, double, date, time, timestamp and character parameters used for processing in the user defined function itself. The system 50 generates the concrete fields at the place of occurrence of the variable field in consecutive order. Each of such generated field obtains a new field name by appending the ordinal number to the base field name of the variable field. The ordinal numbers start from one to the number of fields generated. For example, if the base name of a variable field is 'foo' and the variant repetition count is three, fields with variant field names 'foo1','foo2' and 'foo3' are generated.

Repetition variants from the variable fields are generated contiguously starting from the position of the field in the metadata. For example, if there are five output fields for a UDF with two variable fields at position two and four with repetition counts two and three respectively, the total output fields generated, along with their ordinal numbers in parentheses, would be:
 1. FieldA ($1)
 2. FieldB1 ($2), FieldB2 ($3)
 3. FieldC ($4)
 4. FieldD1 ($5), FieldD2 ($6), FieldD3 ($7)
 5. FieldE ($8)

For the above UDF, the query can retrieve all the output fields with OUTPUT(*) mapping which results in the output of all the fields in the order given above. Given the above list of output fields for the query, the query can use either the field names or the ordinal numbers in any order to select the required output fields. For UDFs with variable fields, the variable field names and the ordinal numbers of the fields vary according to the repetition count of each variable field at query compilation time. When UDF output fields are mapped with the ordinal number of output fields, the resolution and validation utility function determines the repetition count and resolves the ordinal numbers into appropriate output field names.

The fixed data type of all the variable input and output fields is used for all the variant fields generated in a call to the user defined function. If any variable input fields have an undefined data type, the data type of the variable input field is resolved by the data type of the corresponding input field arguments in the query. A general purpose function supplied with the system can be used to validate input and output fields and resolve their data types and lengths at the query compiler 62 when an explicit validation and resolution function is not supplied by the user defined function as a function pointer in the metadata. When UDF input variable metadata fields are defined as a double data type or a similar concrete data type, the UDF processing infrastructure converts the input field arguments to match the UDF data type at the time of processing. When UDF input variable fields are defined as undefined data type, input argument types are passed as such to the UDF and the UDF must perform data conversion if needed. The UDF metadata has the provision to specify a set of fields to be converted to the highest data type in case data type uniformity is required for processing in the UDF. For example, when a set of field arguments belonging to such a group consist of short, unsigned short, int and int64 data types, in one instance they are all implicitly converted to int64, the highest data type in the group when one of the fields has int64 type.

One example of an analytic function that can be implemented in the database system using variable input and output fields governed by parameter expressions is a multiple regression user defined function. It will be appreciated that in a multiple regression analysis, the number of independent measure traits varies according to the regression model fitted which is illustrated in the example below. Accordingly, a user defined function to perform this function will have variable output fields for beta coefficients and averages for independent measure traits, with the count of these variable fields being defined by an integer parameter value representing the number of independent measures in the desired model. The user defined function, for example, can be implemented as an aggregate class type of user defined function because it returns one output row for N input rows processed.

An example query using a specific instantiation of the general multiple regression function is presented below. For example, the query could be used for studying how three independent expenses are affecting the dependent sales figures using a sales and cost database table, for example, data for ten years, with four quarters each, at each region and city in each country:

SELECT country,
MultipleRegression(salesDollarValue, salespersonTrainingCost, advertizementCampaignCost, couponPromotionCost)
OUTPUT(countObservations, alphaIntercept, beta1 AS betaSalespersonTrainingCost, beta2 AS betaAdvertizementCampaignCost, beta3 AS betaCouponPromotionCost, avgIndependent1 AS avgSalespersonTrainingCost, avgIndependent2 AS avgAdvertizementCampaignCost, avgIndependent3 AS avgCouponPromotionCost, avgDependent AS avgSalesDollarValue)
WITH PARAMETER(COUNT_INDEPENDENT_VAR=3)
FROM salesAndCost
GROUP BY country;

In the above example, the first input field is the dependent field which is a fixed field. The second input field is the starting point for the independent fields which is marked as a variable field with a minimum count of one in the metadata, giving the user defined function two input fields. A first output field is the alpha intercept, 'alphaIntercept' and a second output is the average of the dependent measure trait, 'avgDependent,' each of which are fixed fields. A third output field, 'countObservations,' is a fixed field representing the number of observations. A fourth field, marked as a variable field, is named 'beta' and represents the beta coefficients produced by the regression analysis. A fifth field, also marked as a variable field, is named 'avgIndependent' and represents the average values of the independent measure traits.

Note that the fourth field can be repeated until all the beta co-efficient fields are mapped. As described previously, the names of the fields are generated by appending an integer starting from one. Thus, in the given example, there are three beta co-efficient fields with field names beta1, beta2 and beta3 that are generated from the output variable field base name 'beta'. The fifth field, avgIndependent starts only after all the beta fields are mapped and repeats similarly with number appended to it starting from one. Using the output field names or the ordinal number, output fields can be mapped in any order in a query.

The user defined function requires one parameter and looks for COUNT_INDEPENDENT_VAR keyword, that is, the parameter field name in the parameter object to decide which multiple regression model to fit. In case the parameter is not given, since there is only one input variable field, the validation and resolution API function computes the correct repetition number from the total number of input argument fields. In this example given, the model specifies three independent traits and, therefore, three output fields each for 'beta' and 'avgIndependent' are generated. Note that, in the metadata, the variable output fields, beta and avgIndependent, are marked for dependency resolution from the second input variable field. If the query does not map the 'avgIndependent' output fields from independent traits or any other field, the user defined function understands it from the output fields requested by the user query in the output table object and does not project results for them.

A second category of parameters for use in the illustrated system 50 relate to internal processing of the user defined function. Parameter specification for UDFs is a general mechanism to design any application program model for use in SQL queries. To support a variety of known and unknown analytic application requirements, parameters provide a general mechanism to abstract application program models in a UDF framework. Once such UDF framework is built and integrated in the SQL engine, it provides the opportunity to build any type of application as a UDF. To provide specific instantiations of the application program model from this framework, the UDFs can be provided with a variety of internal parameter input values that aid in the internal application configuration and processing.

For example, a number of UDFs require constant values, such as the regression constant value to fit the regression line for the input argument. Alternatively, the function can be provided with a source description to obtain constant values. For example, when UDFs require a number of values for computation or lookup, large data sets can be kept in a local file for which the source description can be given in the UDF parameter. Different kinds of large lookup datasets can be built as trees or sorted records in files or in hosted server applications and consumed while processing the UDF input.

In a number of situations, UDFs require parameters to identify what input fields represent, particularly when it comes to variable input fields. For example, when interaction effects are studied between independent discrete factors in least-squares equations, there is a need to specify the interaction sets of independent factors. When UDFs are built for supporting different related applications using the same input data, parameter values can be used for indicating the desired application computation required for the input. Parameters can also be used to supply runtime program scripts to a UDF or a file name containing program script, allowing the UDF to compile the program script and generate execution code to process the input rows. Large-size scripts can be developed in files, with parameters used for supplying the script file names to the UDFs.

A third category of parameters for use in the illustrated system 50 relate to connectivity with external sources of data utilized by the user defined function. A number of UDF applications require connecting with and processing in external application processes where UDFs act as a client to an external application server. Parameters are needed to model this external application processing. For example, in an enterprise, operational databases are configured to continuously receive and store data as and when the data are generated by various live transacting application processes. Each such application generates only a subset of the enterprise data that impacts other processes in one way or other. Thus, databases are the hubs for many application processes in an enterprise, and can be configured to supply data to external application processes as new rows are inserted into tables. UDFs serve as external gateways for databases where such gateways are usually not accessible. In order to support communication with external processes in databases in a non-intrusive way, UDF parameters play an important role in abstracting connectivity and application processing information. For example, row sending UDFs can be configured with parameters for sending rows to live applications from databases as database triggering UDF execution at row insert or delete or update operation.

In order to connect to external processes, connection information can be provided via parameters in a call to a UDF. The connection information can specify, for example, means for accessing the external process, such as a shared memory key, or an address and port of a TCP/IP, multicast, or UDP connection. For applications that require authentication services, parameters defining a user name and password can also be provided. Similarly, when UDFs require accessing a web-site through a web-server, a uniform resource locator (URL) can be supplied through a parameter. Some UDF applications require processing information in addition to connection information. UDFs that mediate federated query processing, such as table valued user defined functions (TVUDF), can utilize an SQL query for an external database to process. There are innumerable external query service processes that process semi-structured or unstructured data sources and return a table of rows, and each application may require a specific query or script conforming to its own syntax and semantics. To allow a given UDF to utilize any of these processes, application processing queries or scripts are supplied in the form of parameters in UDF queries.

The illustrated database system makes it possible to model complex analytic applications, including statistical applications, in SQL queries. Data processing analytical functions are varied in nature and exhibit different levels of complexity. Using the systems and methods provided herein, many analytic applications can be represented as model program designs capable of solving a variety of application problems with varying datasets and representation of the processing models with parameters. When analytic application program models are built as user defined functions with distinct mapping of input and output, and parameters to describe the processing model, complex analytic problems can be abstracted in simple syntactic expressions for use in SQL queries. This simplifies UDF expressions in SQL queries and makes UDF queries easier to formulate and use. Essentially, by defining a common syntax for UDF expressions in queries and the semantics of processing such expressions, SQL queries can be used to solve complex business analytic problems within the context of the database SQL query processing system.

Using the syntax, categories of analytic application models are abstracted with parameters for modeling variable input and output fields, and variants of user defined function models for internal and external processing can be utilized. The use of the parameter field allows for user defined functions general enough to allow processing of many analytical application models by varying only parameters in queries. Statistical applications such as multiple regression, least-squares, multivariate analytics and frequency distribution can be implemented with different statistical models depending upon the requirements of a given analysis simply by changing the parameter field of the query. Accordingly, parameterization makes it easier to represent complex models in simple key/value pair of parameters.

Figure 3:
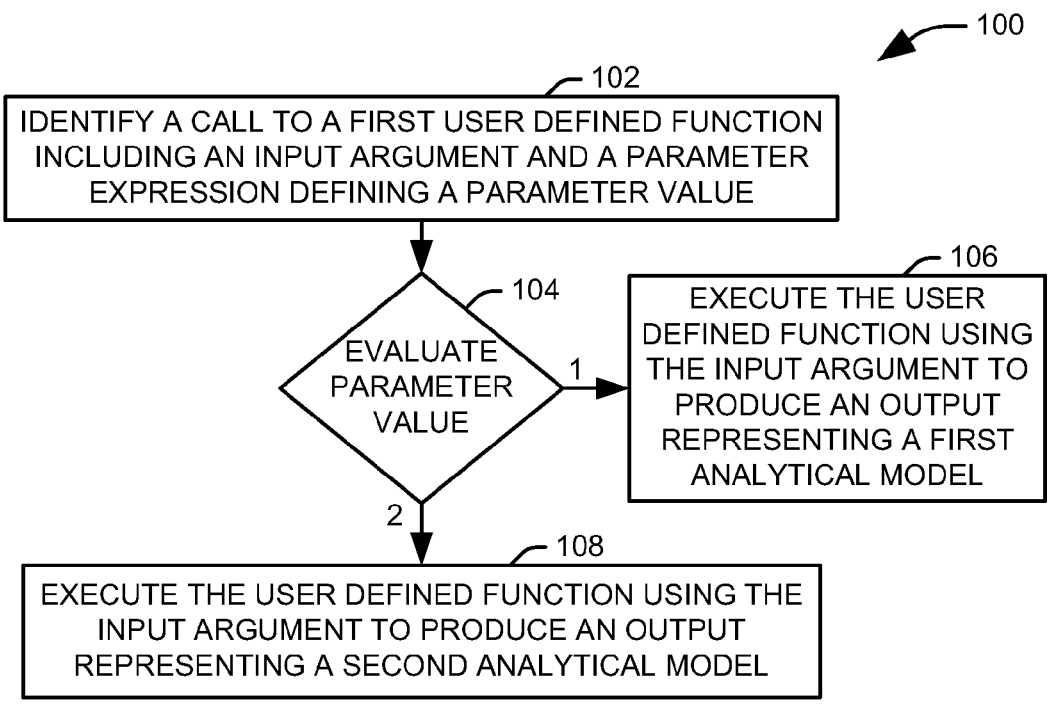
FIG. 3 illustrates one method for executing a query having a user defined function with parameter expressions.

FIG. 3 illustrates one method 100 for executing a query. At 102, a call to a user defined function, representing an application program model, is identified in a structured query language (SQL) query by a query compiler, including input arguments, mapping of output fields and a parameter expression defining parameter values for the user defined function. At 104, the parameter value is evaluated at a processing engine. If it is determined that the parameter expression defines a parameter with a first value (1), the processing engine executes the user defined function using the input argument to provide a function output representing the results of a first value of the parameter to perform a first analytical model at 106. If it is determined that the parameter expression defines a second parameter value (2), the processing engine executes the user defined function using the input argument to provide a function output representing the results of a second value of the parameter to perform a second analytical model at 108.

Figure 4:
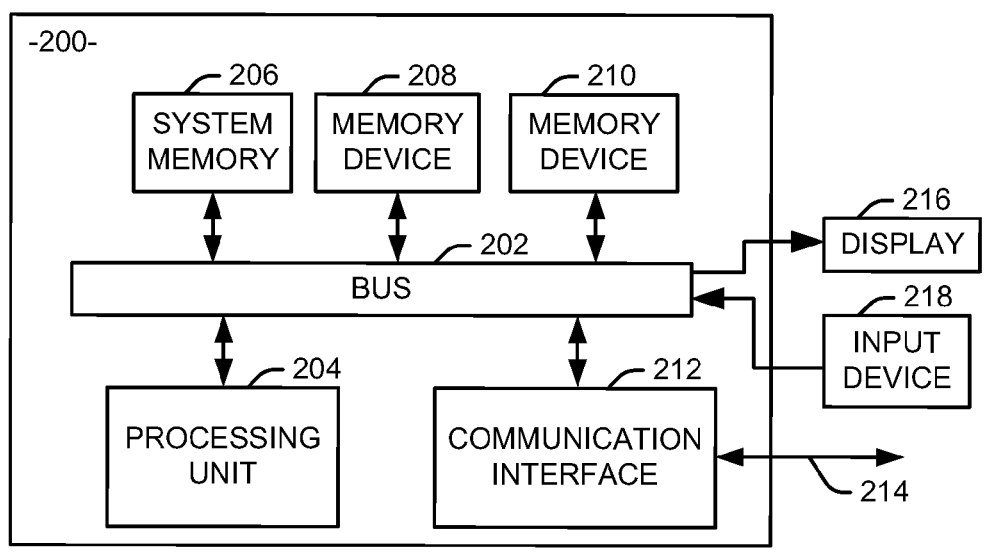
FIG. 4 is a schematic block diagram illustrating an exemplary system of hardware components capable of implementing examples of the systems and methods for user defined function execution with parameter expressions disclosed in FIGS. 1-3.

FIG. 4 is a schematic block diagram illustrating an exemplary system 200 of hardware components capable of implementing the example systems and methods for user defined function integration disclosed in FIGS. 1-3. The system 200 can include various systems and subsystems. The system 200 can be a personal computer, a laptop computer, a workstation, a computer system, an appliance, an application-specific integrated circuit (ASIC), a server, a server blade center, a server farm, or any other appropriate processing component.

The system 200 can include a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 operably interconnects the processing unit 204, the memory devices 206-210, the communication interface 212, the display 216, and the input device 218. In some examples, the system bus 202 also operably interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio.

Additionally, the memory devices 208 and 210 can serve as databases or data storage. Additionally or alternatively, the system 200 can access an external data source or query source through the communication interface 212, which can communicate with the system bus 202 and the communication link 214.

In operation, the system 200 can be used to implement a database system that executes user defined functions within or outside of an online analytics processing (OLAP) framework in response to an appropriate query. The queries can be formatted in accordance with various query database protocols, including SQL. Computer executable logic for implementing the real-time analytics system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution.

What have been described above are examples of the present invention. It is, of course, not possible to describe every conceivable combination of components or methodologies for the purpose of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. An analytical data processing system comprising:
a processor;
a non-transitory computer readable medium, comprising machine readable instructions executable by the processor, the instructions comprising:
a query compiler to identify a call to a user defined function, including an input expression that defines input values for the user defined function and a parameter expression, comprising a key and a value pair where key is the name of the parameter field metadata and the value is a constant or an expression that evaluates to a constant value at the time of invoking the user, for the user defined function, within a query; and
a processing engine to execute the user defined function to provide a function output according to the input expression and the parameter expression.

2. The analytical data processing system of claim 1, wherein the user defined function represents an application program model, such that the function output represents the results of a first analytical model, evaluated using the defined input values, for a first parameter expression and the function output represents the results of a second analytical model, evaluated using the defined input values, for a second parameter expression.

3. The analytical data processing system of claim 2, wherein the user defined function has a variable field defining a class of fields for the generation of zero, one, or multiple concrete field instances at runtime of the user defined function, the variable field being one of a variable input field and a variable output field, the parameter expression evaluating to an integer repetition count defining a number of variant fields represented by the variable field.

4. The analytical data processing system of claim 3, the variable field comprising a variable output field and the user defined function having metadata exposed to the query compiler and the processing engine, the metadata including a base field name for the variable output field, and the variant fields represented by the variable output field having names generated in an output table object formed from the base field name and an ordinal number.

5. The analytical data processing system of claim 3, wherein the variable field has associated metadata comprising a field indicating a minimum repetition count, such that if the minimum repetition count is one, the variable field must occur in a call to the user defined function, and if the minimum repetition count is zero, the variable field can be omitted from a call to the user defined function.

6. The analytical data processing system of claim 1, the query complier accessing a utility function associated with the user defined function, the utility function validating an associated data type of the parameter expression according to a data type provided by metadata associated with the user defined function and evaluating the parameter expression.

7. The analytical data processing system of claim 1, the user defined function comprising parameter metadata defining an associated data type for the parameter expression, the associated data type comprising any of Boolean, integer, double, string, date, time, timestamp, and their array types.

8. The analytical data processing system of claim 1, the user defined function comprising parameter metadata indicating, for each of a plurality of parameters associated with the user defined function, whether a parameter is mandatory, such that a parameter expression associated with the parameter must be present in a call to the user defined function, or optional, such that no parameter expression associated with the parameter is necessary in a call to the user defined function.

9. The analytical data processing system of claim 8, the parameter metadata further comprising, for a parameter indicated as optional, a default value, such that when no parameter expression associated with the parameter is present in the call to the user defined function, the default value is used for the execution of the user defined function.

10. The analytical data processing system of claim 2, wherein the parameter expression provides a constant parameter value for an internal processing requirement of the user defined function.

11. The analytical data processing system of claim 2, the parameter expression supplying a runtime program script or a file name containing a program script for the user defined function, the user defined function compiling the program script to generate an execution code and to process input rows represented by the input expression.

12. The analytical data processing system of claim 1, wherein the parameter expression comprises information for one of connecting, accessing, processing and generating output from an external data processing system.

13. An analytical data processing system comprising:
- a processor;
- a non-transitory computer readable medium, comprising machine readable instructions executable by the processor, the instructions comprising:
  - a query compiler to identify a call to a user defined function, the user defined function representing an application program model and including an input expression that defines input values for the user defined function and an parameter expression, comprising a key and a value pair where key is the name of the parameter field metadata and the value is a constant or an expression that evaluates to a constant value at the time of invoking the user, defining a parameter value for the user defined function, within a query; and
  - a processing engine to execute the user defined function to provide a function output according to the input expression and the defined parameter value, such that the function output represents the results of a first analytical model, evaluated using the defined input values, for a first parameter expression and the function output represents the results of a second analytical model, evaluated using the defined input values, for a second parameter expression.

14. The analytical data processing system of claim 12, wherein the user defined function has an associated variable field and the defined parameter value represents a number of variant fields represented by the variable field.

15. A non-transitory computer readable medium storing machine executable instructions, the machine executable instructions comprising:
- a query compiler to identify a call to a user defined function, an input expression defining a variable input field, representing a class of fields for the generation of zero, one, or multiple concrete input field instances at runtime of the user defined function, and an output expression defining a variable output field, representing a class of fields for the generation of zero, one, or multiple concrete input field instances at runtime of the user defined function, for the function within a query, and an integer parameter expression defining a number of concrete input field instances represented by each variable field and generate an input table object and an output table object for the user defined function, the generated output object containing the fields represented by the variable input field and the variable output field; and
- a processing engine to execute the user defined function with the input and parameter expressions and populate the fields represented by the variable output field in the output table object with the output of the user defined function.

* * * * *